United States Patent
Desai et al.

(10) Patent No.: US 11,151,225 B2
(45) Date of Patent: Oct. 19, 2021

(54) LICENSE MANAGEMENT IN PRE-BOOT ENVIRONMENTS

(71) Applicant: Dell Products, L.P., Round Rock, TX (US)

(72) Inventors: Satyajit Dipakbhai Desai, Round Rock, TX (US); Sanjeev Dambal, Austin, TX (US); Krishna P. Mohan, Austin, TX (US); Sruthi Reddy Mothukupally, Round Rock, TX (US); Mark W. Shutt, Austin, TX (US); Wayne R. Weilnau, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 386 days.

(21) Appl. No.: 15/045,383

(22) Filed: Feb. 17, 2016

(65) Prior Publication Data
US 2017/0235928 A1    Aug. 17, 2017

(51) Int. Cl.
*G06F 21/10* (2013.01)
*G06F 21/57* (2013.01)
*G06F 9/44* (2018.01)
*G06F 13/16* (2006.01)
*G06F 9/4401* (2018.01)

(52) U.S. Cl.
CPC .......... *G06F 21/105* (2013.01); *G06F 9/4401* (2013.01); *G06F 9/4406* (2013.01); *G06F 9/4416* (2013.01); *G06F 13/1663* (2013.01); *G06F 21/572* (2013.01); *G06F 21/577* (2013.01); *G06F 2221/031* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 9,614,678 B2* | 4/2017 | Brundridge | ............ | H04L 9/3247 |
| 9,811,644 B1* | 11/2017 | Ahmed | .................... | H04W 4/02 |
| 10,430,562 B2* | 10/2019 | Brundridge | ............. | G06F 21/10 |
| 10,467,388 B2* | 11/2019 | Brundridge | ........... | G06F 21/105 |
| 2003/0208338 A1* | 11/2003 | Challener | ............. | G06F 21/575 |
| | | | | 702/186 |
| 2006/0129675 A1* | 6/2006 | Zimmer | ................ | G06F 1/3209 |
| | | | | 709/225 |
| 2008/0228513 A1* | 9/2008 | McMillan | ............. | G06F 21/105 |
| | | | | 705/1.1 |

(Continued)

OTHER PUBLICATIONS

Microsoft Press Computer Dictionay, Second Edition, 1994, 3 pages including p. 44.*

*Primary Examiner* — Tanh Q Nguyen
(74) *Attorney, Agent, or Firm* — Fogarty LLP

(57) ABSTRACT

Systems and methods for enabling license management in pre-boot environments are described. In some embodiments, a method may include: loading, by a Basic System Input/Output (BIOS) of an Information Handling System (IHS), prior to the booting of any Operating System (OS) by the IHS, a license manager Unified Extensible Firmware Interface (UEFI) driver; and executing, by the BIOS, a command received from a component or device coupled to the IHS following a license management protocol provided by the UEFI driver, where the command is to obtain or verify license data.

7 Claims, 6 Drawing Sheets

(56) References Cited

U.S. PATENT DOCUMENTS

| | | | |
|---|---|---|---|
| 2008/0256349 A1* | 10/2008 | Dennis | G06F 21/128 |
| | | | 713/1 |
| 2010/0318629 A1* | 12/2010 | Smith | G06F 21/128 |
| | | | 709/217 |
| 2011/0173251 A1* | 7/2011 | Sandhu | G06F 21/53 |
| | | | 709/203 |
| 2011/0302343 A1* | 12/2011 | Butcher | G06F 9/4401 |
| | | | 710/107 |
| 2014/0090051 A1* | 3/2014 | Brundridge | G06F 21/14 |
| | | | 726/17 |
| 2015/0370575 A1* | 12/2015 | Tonry | G06F 21/10 |
| | | | 713/2 |
| 2017/0168845 A1* | 6/2017 | Munger | G06F 9/4406 |
| 2017/0185771 A1* | 6/2017 | Sun | G06F 21/56 |
| 2017/0220802 A1* | 8/2017 | Huang | G06F 21/575 |
| 2017/0235928 A1* | 8/2017 | Desai | G06F 21/105 |
| | | | 713/2 |

* cited by examiner

LICENSE MANAGEMENT IN PRE-BOOT ENVIRONMENTS

FIELD

This disclosure relates generally to Information Handling Systems (IHSs), and more specifically, to license management in pre-boot environments.

BACKGROUND

As the value and use of information continues to increase, individuals and businesses seek additional ways to process and store information. An option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An IHS may include various components such as a network interface card, a host bus adaptor, a redundant array of independent disks, a controller, etc. Each of these components may have a different manufacturer that requires a user of the server to acquire a license before using the component or a feature thereof.

SUMMARY

Embodiments of systems and methods for enabling license management in pre-boot environments are described herein. In an illustrative, non-limiting embodiment, a method may include loading, by a Basic System Input/Output (BIOS) of an Information Handling System (IHS), prior to the booting of any Operating System (OS) by the IHS, a license manager Unified Extensible Firmware Interface (UEFI) driver; and executing, by the BIOS, a command received from a component or device coupled to the IHS following a license management protocol provided by the UEFI driver, where the command is to obtain or verify license data.

In some cases, the license may be obtained or verified prior to the booting of any OS by the IHS being completed. The method may also include loading, by the BIOS, an Option Read Only Memory (ROM) of a component or device coupled to the IHS by starting a UEFI binding process prior to receiving the command. The license data may be configured to allow the component or device to enable a corresponding feature in the component or device. The command may include an Intelligent Platform Management Interface (IPMI) or Shared Memory Access (SMA) command. Executing the command may include communicating with a license store. The license store may be provided by a baseboard management controller (BMC) coupled to the IHS. The method may further comprise rebooting the IHS in response to a request from the component or device indicating that the license data requires a reboot in order to take effect.

In another illustrative, non-limiting embodiment, an Information Handling System (IHS) may include a processor; and a memory coupled to the processor, the memory having program instructions stored thereon that, upon execution by the processor, cause the IHS to: load, by a Basic System Input/Output (BIOS) of the IHS, prior to the booting of any Operating System (OS) by the IHS, a license manager Unified Extensible Firmware Interface (UEFI) driver; and execute, by the BIOS, a command received from a component coupled to the IHS following a license management protocol provided by the UEFI driver, where the command is to obtain or verify license data.

In yet another illustrative, non-limiting embodiment, a memory storage device may have program instructions stored thereon that, upon execution by a processor of an Information Handling System (IHS), cause the IHS to: load, by a Basic System Input/Output (BIOS) of the IHS, prior to the booting of any Operating System (OS) by the IHS, a license manager Unified Extensible Firmware Interface (UEFI) driver; and execute, by the BIOS, a command received from a component coupled to the IHS following a license management protocol provided by the UEFI driver, where the command is to obtain or verify license data.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
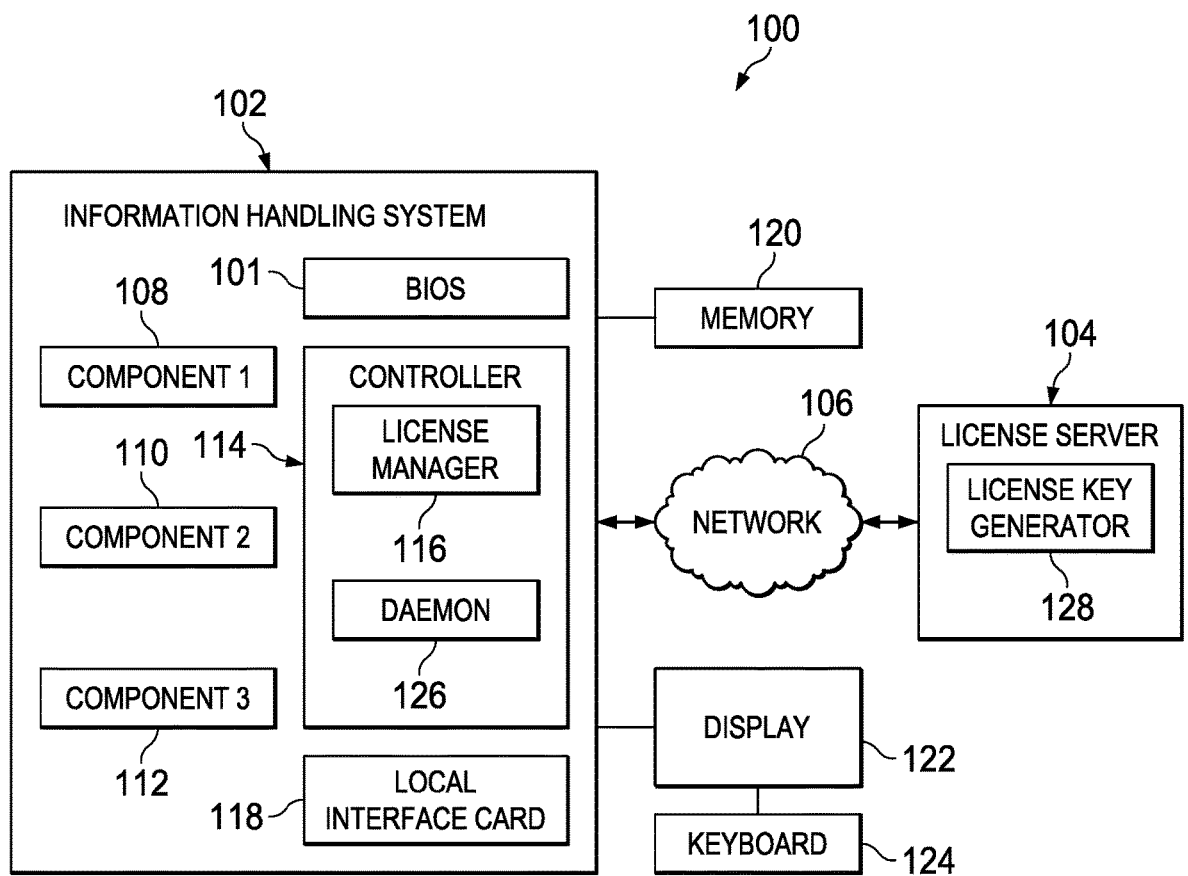
FIG. 1 is a block diagram of an example of a licensing system according to some embodiments.

In various embodiments, systems and methods described herein may enable license management in pre-boot environments. FIG. 1 illustrates a block diagram of licensing system 100 for an Information Handling System (IHS) 102. For purposes of this disclosure, IHS 102 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Licensing system 100 includes IHS 102 that communicates with license server 104 via network 106. IHS 102 includes components 108, 110, and 112, controller 114, BIOS 101, and local interface card 118. Controller 114 is in communication with components 108, 110, and 112, with local interface card 118, and with memory 120. Memory 120 may be external to IHS 102, or it may be located within the IHS. BIOS 101 is described in more detail in connection with FIGS. 3 and 4 below.

Local interface card 118 may communicate with local display 122 and with local keyboard 124. Local interface card 118 may be an integrated keyboard, video, and mouse (iKVM) interface card that may provide a local user with access to each of components 108, 110, and 112.

Controller 114 includes license manager 116 and daemon 126. Controller 114 may be any type of controller, such as an integrated Dell Remote Access Controller (iDRAC), which is an interface card that may provide out-of-band management of the IHS 102. In some embodiments, controller 114 may be a baseboard management controller (BMC), which is another interface card that may provide out-of-band management of the IHS 102. Controller 114 may have a processor, a memory, a battery, a network connection, and access to a server chassis bus. The controller 114 may provide different functions for IHS 102 such as power management, virtual media access, and remote console capabilities. A local user may utilize local interface card 118, local display 122, and keyboard 124 to communicate with controller 114 to access, configure, or assign a license to one of the components 108, 110, and 112, and controller 114.

Components 108, 110, and 112 in IHS 102, also referred to herein simply as "devices," may be constituent elements of IHS 102, and may include hardware and other subsystems. Some examples of components include embedded devices, modules providing systems management features, modules providing basic input/output system (BIOS) functionality, original equipment manufacturer (OEM) features, OEM branding, and modules providing Peripheral Component Interconnect-Express (PCIe) functionality. Separate vendors of hardware components may each require a user to receive a license to use the component or a particular feature thereof.

When IHS 102 is turned on, license manager subsystem 116 may communicate with daemon process 126 to detect the components in the IHS. License manager subsystem 116 may also determine whether any of components 108, 110, and 112 require activation pursuant to a license. If so, license manager subsystem 116 may communicate with the component over a uniform, device independent protocol to activate the component pursuant to a license. The uniform protocol may consist of a language for communications about licensing between a license manager subsystem and a component of an IHS. The language may be capable of use by multiple devices of different types. It may also be transport and wire independent. In some embodiments, the language may consist of a series of requests and responses.

In further embodiments, pursuant to the uniform protocol, license manager subsystem 116 may send to the component a request for identification and the component may send a response pursuant to the uniform protocol. The response may provide a unique identification (ID) for the component, such as a peripheral component interconnect (PCI) ID string. In some embodiments, the response may also provide a device type and manufacturer.

License manager subsystem 116 may then check its list of licenses against the ID of the component. It may verify that it holds a license for the component with the ID. In some embodiments, license manager subsystem 116 may also verify that the license is for the device type and manufacturer of the component. Alternatively, license manager subsystem 116 may determine that it does not have a license covering the component, either because it does not have a license for the type of component or because it does not have a license for the particular ID. For each component lacking a license and requiring activation pursuant to a license, license manager subsystem 116 may request from license server 104 a license for the component and send to license server 104 the unique ID for the component.

License server 104 includes license key generator (LKG) 128 that may generate the license for a specific component based on the unique ID of the component. For example, LKG 128 may determine whether the unique ID of a component is a proper unique ID. If the unique ID is proper, LKG 128 may generate the license, and may sign the license with a signature. The signature may be an encrypted signature in an extensible markup language (XML) format, or the like. License server 104 may also include the unique ID of the component within the license, such that the unique ID of the license may be matched with a unique ID of a component. In some embodiments, license server 104 may also include the manufacturer and device type in the license.

For some components, the license for a component may delineate a specific list of features of the component to be activated by the license. LKG 128 may also include other restrictions on the license based on licensing requirements of the manufacturer of the component. The other restrictions may be that the license is bound to a specific platform, that the license is bound to a service tag or to the unique ID, that the license has a time constraint, or the like. Binding the license to a specific platform may cause the license to be valid only for a specific system ID, such as an ID associated with IHS 102. Binding the license to a specific platform may also cause the license to be valid only for a specific platform generation, such as a specific operating system generation. Binding the license to a service tag or unique ID may cause the license to be valid only for a component that has a service tag or unique ID that matches the unique ID of the license.

The time constraint for the license may limit the license to a specific amount of time, indicate a start date and/or an end date of the license, indicate that the license is valid during an evaluation period, or the like. In some embodiments, the license may also include a password, passphrase, or other security token to be passed from license manager subsystem 116 to the component. In further embodiments, the password, passphrase, or other security token may be encoded in the license so that it is not readable by a human being. In a few embodiments, LKG 128 may encode details of the license pursuant to an established protocol, in order that license manager 116 is able to parse the license to extract feature information without the need for specific instructions. LKG 128 may, for example, generate the license according to a form of XML generally used for licenses.

License server 104 may send the license to license manager subsystem 116 with the license being embedded in an email, via a web portal interface, via a license management tool, or the like. When license manager subsystem 116 has received the license, the license manager subsystem may store the license in a local storage medium, such as memory 120.

Once license manager subsystem 116 has a license for a component available, either because it matched an already-held license with the component or because it ordered a new license and received it from license server 104, license manager subsystem 116 may activate the component or feature based upon the license. In case there are restrictions on the use of the component, before activating the component license manager subsystem 116 may parse the license to determine whether the operation of the component complies with the terms of the restrictions. If for example the licensing requires a certain operating system, license manager subsystem 116 may determine if the component is operating under control of that operating system. If the restrictions are met, license manager subsystem 116 may activate the component or feature. Otherwise, license manager subsystem 116 may refrain from activating the component or feature under the license.

To activate a component, license manager subsystem 116 may issue a feature enablement command to the component pursuant to the uniform protocol. The uniform protocol may provide that data about features to be enabled is passed with the command. In some embodiments, the data may be placed in a command buffer to be read by the component upon receipt of the command.

In many embodiments, the license manager subsystem 116 may transform data contained in the license into a form suitable for passing to the component. If the license contains a list of features to be enabled, for instance, license manager subsystem 116 may abstract the set of features into a binary representation by using bitmaps. Each bit of the bitmap may represent one individual licensable feature.

For example, for the licensing of an iDRAC, bit 0 may control enabling a License GUI and bit 1 may control a command-line interface (CLI). In another example, for licensing a network interface card (NIC), bit 0 may control Fibre Channel over Ethernet (FCoE) functionality and bit 1 may control Small Computer Interface over Internet (iSCSI). Both component firmware and license manager subsystem 116 may be aware of the bit definitions, and the bit definitions may be vendor independent. In other embodiments, however, the license sent from LKG 128 to license manager subsystem 116 may have already encoded the feature set as a bitmap. In addition, if the license contains an encoded password, passphrase, or other security token, license manager subsystem 116 may decode it before passing it to the component.

In further embodiments, license manager subsystem 116 may pass the features bitmap to the component in the command buffer. The component may read the bitmap and activate the indicated features. In some embodiments, the activation step may also require license manager subsystem 116 to pass to the component a password or other security token to indicate that license manager subsystem 116 has the authority to activate the component. In some embodiments, a process other than a daemon process may detect the addition of components to an IHS. The process may, for example, detect components only upon start-up or reboot.

Embodiments of FIG. 1 may simplify the process of activating a device or other component of an information handling system that requires a license for operation. The embodiments may enable the activation of devices added to the IHS pursuant to a uniform procedure. The procedure may be completely or largely automatic. Further, in embodiments of FIG. 1, aspects of the license may be transparent to a user; that is, the user may parse the XML of the license to understand aspects of the license, such as an identification of the device under license and the list of features to be enabled. Without the use of a uniform procedure, a system administrator may be required to undergo different procedures for different manufacturers. For some devices, the procedure may require an administrator to manually enter a licensing code as part of the licensing protocol, such as entering the code into an option read-only memory (ROM) or during start-up in the disk operating system (DOS). Further, the license code may be an arbitrary string of characters that does not convey information to a system administrator about operation of the license.

Figure 2:
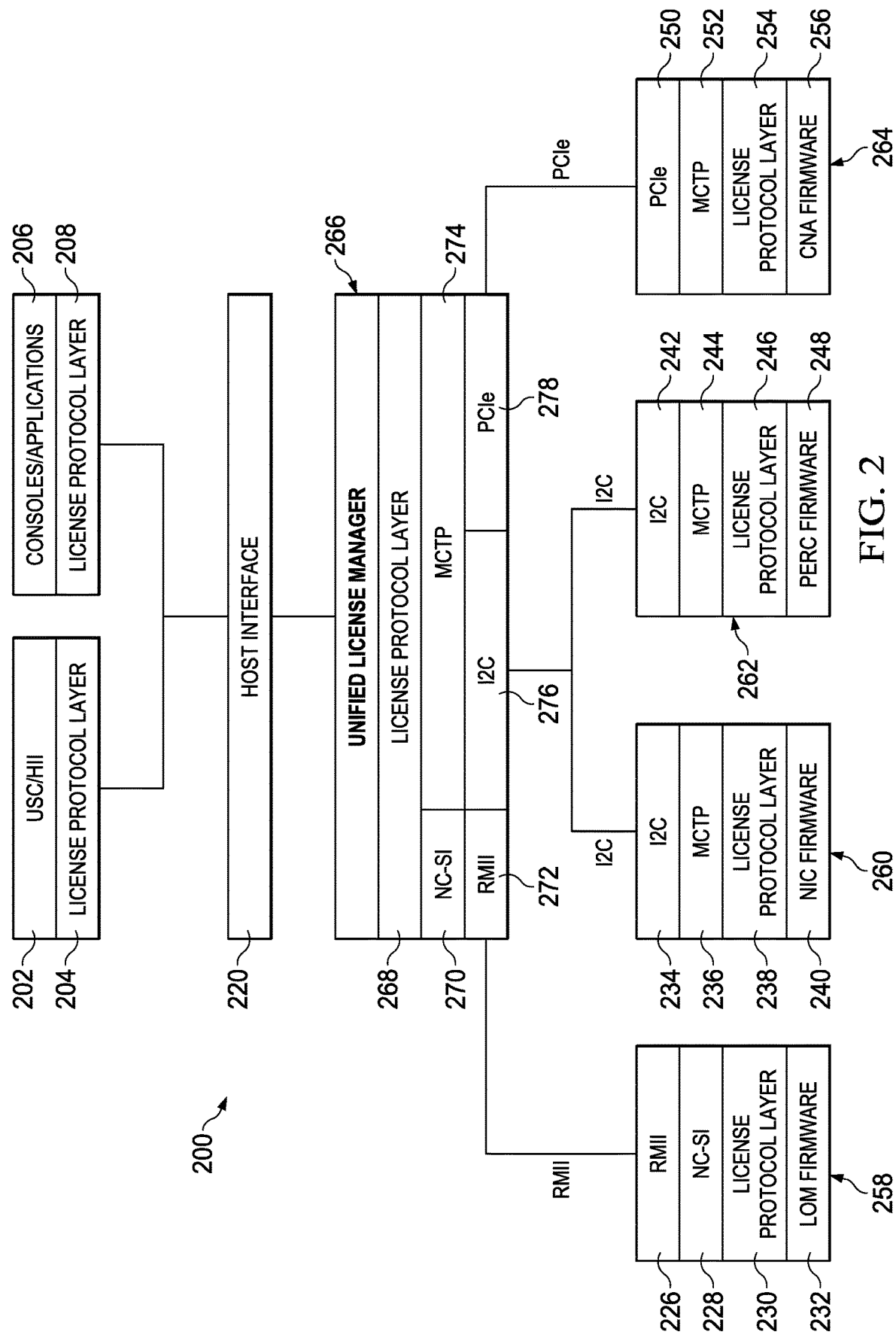
FIG. 2 is a block diagram of an example of a license management system according to some embodiments.

FIG. 2 shows the components of a system 200 to manage licenses for components of a computing device. Particularly, managing system 200 includes Unified Server Configurator (USC)/Human Interface Infrastructure (HII) 202, consoles/applications 206, host interface 220, unified license manager 266, and components 258, 260, 262, and 264.

Unified license manager 266 includes license protocol layer 268, Network Controller Sideband Interface (NC-SI) 270, Management Component Transport Protocol (MCTP) 274, Reduced Media Independent Interface (RMII) 272, Inter-Integrated Circuit (I.sup.2C) 272, I.sup.2C 274, and PCIe 278. Unified license manager 266 may manage licenses for components of an IHS such as a server. It may detect components in the IHS, determine if they require licenses, communicate with them to obtain information used in obtaining licenses, request the licenses, activate the components, deactivate and remove the licenses, and communicate information about the licenses to management systems. In some embodiments, unified license manager 266 may be implemented as or within license manager subsystem 116 of controller 114 of FIG. 1.

License protocol layer 268 may provide for carrying out licensing transactions under a uniform protocol. The transactions may include obtaining an identification of a component, activating the component, removing a license, and requesting a unique identification from a component. Unified license manager 266 may operate under a variety of management software tools and under a variety of bus connections to components of an information handling system. In the embodiment of FIG. 2, unified license manager 266 may operate under both NC-SI, in NC-SI layer 270, and MCTP, in MCTP layer 274. MCTP is a media-independent protocol for intercommunication among intelligent devices within the platform management subsystem of a managed computer system. NC-SI is an electrical interface and protocol defined by the Distributed Management Task Force that may enable the connection of a baseboard management controller to a network interface controller in server computer systems for the purpose of enabling out-of-band remote manageability.

NC-SI layer 270 communicates with component 258 over an RMII bus protocol. An MII bus (standardized by IEEE 802.3u) may connect different types of physical transceivers to Media Access Controllers (MAC). Thus, any MAC may be used with any transceiver, independent of the network signal transmission media.

MCTP layer 274 communicates with components 260, 262, and 264 both over I²C and PCIe buses through I²C layer 275 and PCIe layers 278 respectively. I²C is a multi-master, two-wire serial bus. It may be used to attach peripherals to a motherboard. In other embodiments, unified license manager 266 may operate under other management protocols or through other bus methods of communication.

In some embodiments, unified license manager 266 may communicate with components 258, 260, 262, and 264 under a uniform, device-independent, management-protocol-independent, wire independent communications protocol. The communications protocol may provide for unified license manager 266 to issue such commands as Request Device Information, Feature Enablement, Revoke License, and Assign Unique License Device ID to components connected to an information handling system. The Request Device Information command may request information about a component, such as an identification, a type, or a manufacturer. The Feature Enablement command may instruct the component to activate itself. The Revoke License command may inform the component that the license has been revoked, and that the component is to cease operations. The Assign Unique License Device ID may request a unique identification from the component for use in a license. The commands may be embedded as commands in the management protocols. In some embodiments, the license protocol payload over NC-SI may be carried in OEM command (0x50) and response (0xDO). For MCTP, a license command may be carried within message type 0x7E, with the "Application Type" byte set to 0x01 for a licensing message.

Host interface 220 may provide an interface between unified license manager 266 and USC/HII 202, and between unified license manager 266 and consoles/applications 206. USC/HII 202 and consoles/applications 206 are interfaces for system management and may be used to configure the components that have been activated by unified license manager 266. USC/HII 202 may provide an embedded configuration utility that may reside on an embedded flash memory card. It may be launched during the boot sequence, and may function in a pre-operating system environment. USC/HII 202 may enable systems and storage management tasks from an embedded environment throughout the life cycle of a system. Consoles/applications 206 are a console and software to enable a system administrator to control an information-handling system. USC/HII 202 and Consoles/applications 206 include license protocol layers 204 and 208, respectively. The license protocol layers handle licensing details, such as which components have been licensed.

Components 258, 260, 262, and 264 are connected to unified license manager 266 through buses RMII, I²C, and PCIe. Each component has a software layer for the wire communications, layers RMII 226, I²C 234, and I²C 242, and PCIe 250 respectively; layers for communicating according to the management protocols, layers NC-SI 228, MCTP 236, MCTP 244, and MCTP 252 respectively; license protocol layers 230, 238, 246, and 254 respectively; and firmware layers, Local Area Network (LAN) on a motherboard (LOM) firmware 232, NIC firmware 240, DELL POWEREDGE redundant array of independent disks (RAID) Controller (PERC) firmware 242, and converged network adapter (CNA) firmware 256, respectively.

License protocol layers 230, 238, 246, and 254 implement uniform protocols for communicating with unified license manager 266 concerning licensing operations. The license protocol layers may enable components 258, 260, 262, and 264 to interpret and respond to licensing commands such as those described above. In some embodiments, to be compliant with the protocols, the license protocol layers of unified license manager 266 and components 258, 260, 262, and 264 are required to implement certain licensing commands. The implementation of other commands may be optional for compliance. In further embodiments, the Assign Unique License Device ID may be optional and the other commands may be mandatory.

Firmware 232, 240, 248, and 256 may include code contained in non-volatile memory, such as flash memory, for integrating a component with an operating system. In some embodiments, the firmware may contain data to be used in the licensing process, such as a unique identification number for the component, a password or other security token for the component, or a license key or a license number. In some embodiments, the data must be matched with data supplied to the component during the licensing process before the component may be activated. In addition, when a bitmap or other representation of features to be activated is passed to the component, the firmware may be able to parse the bitmap or other representation, determine which features are to be activated, and activate those features.

In the embodiment of FIG. 2, component 258 may be a LOM, and LOM firmware 232 may support the LOM. Component 260 may be a network interface card, and NIC firmware 240 may support the NIC. Component 262 may be RAID controller and PERC firmware 248 may support the RAID controller. Component 264 may be a CNA, a computer input/output device that combines the functionality of a host bus adapter with a network interface controller. A single card may provide access to both a storage area network and a general-purpose computer network. CNA firmware 256 may support the CNA 264.

In FIG. 2, components 258, 260, 262, and 264 are connected to an IHS through buses RMII, I²C, and PCIe and operate under management protocols NC-SI and MCTP. In other embodiments, however, components may be connected through other wire or bus methods of communication and may operate under other management protocols.

In various embodiments, the systems and methods described herein may provide a define mechanisms for performing license management in a pre-boot environment, by using a protocol extension provided via BIOS 101.

Figure 3:
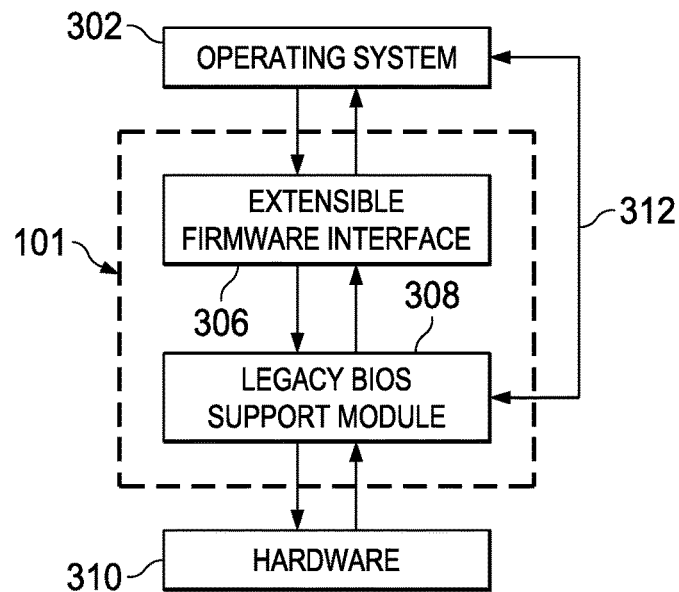
FIGS. 3 and 4 are block diagrams of examples of aspects of an Extensible Firmware Interface (EFI) environment utilized by systems and methods described herein according to some embodiments.

Referring now to FIG. 3, examples of aspects of an Extensible Firmware Interface (EFI) environment created by BIOS 101 of IHS 102 are described according to some embodiments. As shown, BIOS 101 comprises a firmware compatible with the EFI Specification from INTEL or from the Unified Extensible Firmware Interface (UEFI) Forum. The EFI Specification describes an interface between OS 302 and system firmware 101; particularly, the EFI Specification defines the interface that platform firmware 101 implements, and the interface that OS 302 may use in booting.

According to an implementation of EFI, both EFI 306 and legacy BIOS support module 308 may be present in firmware 101. This allows IHS 102 to support both firmware interfaces. In order to provide this, interface 312 may be used by legacy OSs and applications. Additional details regarding the architecture and operation of EFI 306 are provided below with respect to FIG. 4. Moreover, additional details regarding the operation and architecture of EFI may be found in the EFI Specification and the Framework, which are available from INTEL.

Figure 4:
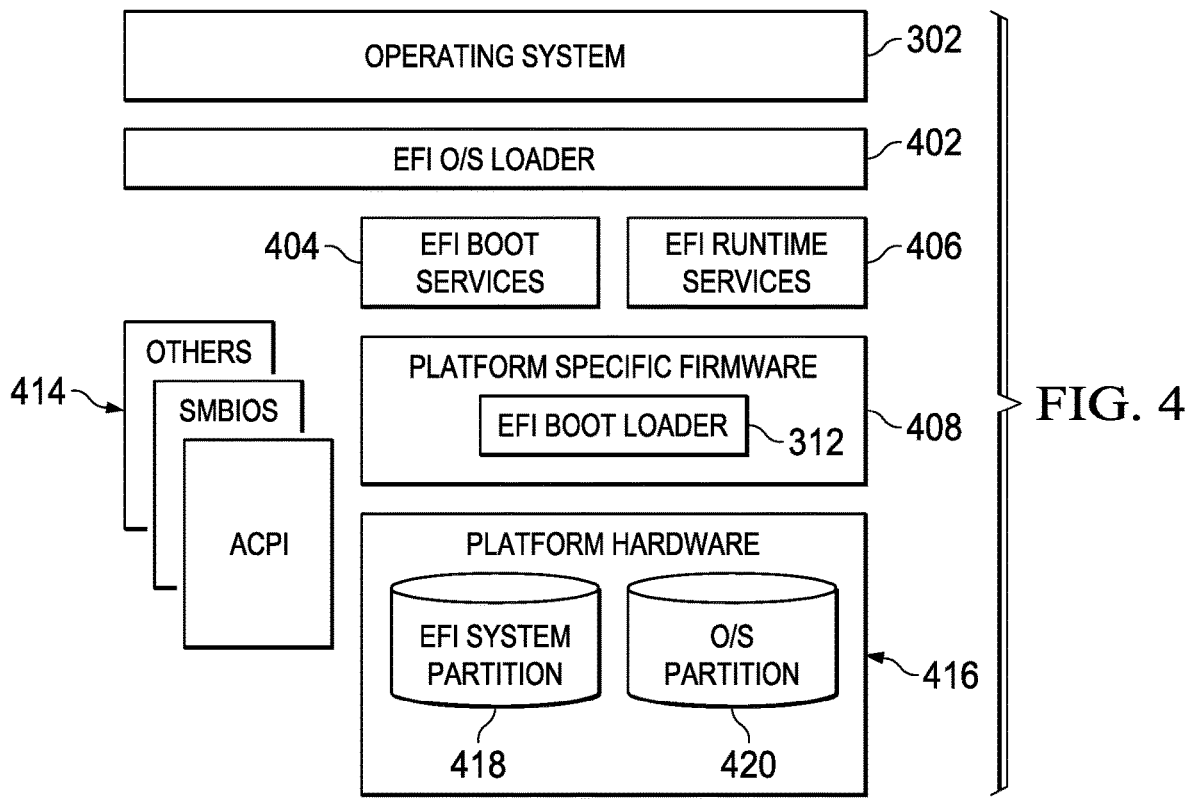

Turning to FIG. 4, additional details regarding an EFI Specification-compliant system utilized to provide an operating environment for various embodiments are described.

As shown, the system includes platform hardware 416 and OS 302. Platform firmware 408 may retrieve an OS image from EFI system partition 418 using an EFI O/S loader 402. EFI system partition 418 may be an architecturally shareable system partition. As such, EFI system partition 418 defines a partition and file system that are designed to allow safe sharing of mass storage between multiple vendors. O/S partition 420 may also be utilized.

Once started, EFI O/S loader 402 continues to boot the complete OS 302. In doing so, EFI O/S loader 402 may use EFI boot services 404 and interface to other supported specifications to survey, comprehend, and initialize the various platform components and the operating system software that manages them. Thus, interfaces 414 from other specifications may also be present on the system. For example, the Advanced Configuration and Power Management Interface (ACPI) and the System Management BIOS (SMBIOS) specifications may be supported.

EFI boot services 404 provide interfaces for devices and system functionality that may be used during boot time. EFI runtime services 406 may also be available to the O/S loader 402 during the boot phase. For example, a minimal set of runtime services may be presented to ensure appropriate abstraction of base platform hardware resources that may be needed by the operating system 302 during its normal operation. EFI allows extension of platform firmware by loading EFI driver and EFI application images which, when loaded, have access to all EFI-defined runtime and boot services.

Various program modules provide boot and runtime services. These program modules may be loaded by EFI boot loader 412 at system boot time. EFI boot loader 412 is a component in the EFI firmware that determines which program modules should be explicitly loaded and when. Once the EFI firmware is initialized, it passes control to boot loader 412. Boot loader 412 is then responsible for determining which of the program modules to load and in what order.

In some embodiments, systems and methods described herein define a pre-boot license management driver in the aforementioned pre-boot environments that implements at least the following interfaces: "GetLicenseData," "VerifyLicenseData," and "ResetSystem." By providing a pre-boot license management driver that includes these interfaces, any vendor device may be adapted to use these interfaces and may therefore have a uniform license management mechanism available to it in a pre-boot environment.

Particularly, the GetLicenseData interface allows devices or components to get their license information from a license store. This interface may be used by devices that do not have capability to persist their license data (e.g., RAID S140 PERC controller). These devices may use this interface at every host boot and retrieve their license data and apply it.

The VerifyLicenseData interface allows devices that have persisted their license data to verify it with the license store. For example a PERC controller will use this interface to send its persisted license data to the license store for verification on every boot. If the data has not changed then this interface may simply return success and the IHS may continue its normal boot. But if the license store has a different license data, then it may return the new license data back to the device. The device may then apply the new license data.

The ResetSystem interface allows any device to request BIOS 101 to reboot the system. This interface is useful in cases where devices have applied new license data and need a system reboot for the new license data to be effective. If the device does not need a system reboot, it may use the above-defined interfaces to get their license and let BIOS 101 continue its normal boot.

In some embodiments, a UEFI license management protocol and a license data structure may be provided that allow license management commands to be sent to a license store independently of or before any Operating System is booted in IHS 102. Component or device vendors can use this protocol in their option ROM drivers to perform license management functionality.

An example of a UEFI license management protocol and a license data structure is provided below:

```
GUID
#define EFI_LICENSE_MANAGEMENT_PROTOCOL_GUID \
{0x11af185d, 0x2a5e, 0x49c7, 0x9edb, 0x49, 0xca, 0x20, 0x1a, 0x94, 0xa5}
Protocol Interface Structure
typedef struct _EFI_LICENSE_MANAGEMENT_PROTOCOL {
    EFI_LICENSE_MANAGEMENT_GET_LICENSE_DATA
    GetLicenseData,
    EFI_LICENSE_MANAGEMENT_VERIFY_LICENSE_DATA
    VerifyLicenseData,
    VOID ResetSystem;
} EFI_LICENSE_MANAGEMENT_PROTOCOL;
// A generic data structure to encapsulate all license data
typedef struct _EFI_LICENSE_DATA {
    // field that uniquely identifies a device (e.g., FQDD)
    VOID* DeviceIdentifier;
    UINT64 FeatureEnableBits;
    UINT64 FeatureCapabilityBits;
} EFI_LICENSE_DATA;
```

Server vendors may implement a UEFI driver that implements the above-described license management protocol. The UEFI driver may be part of BIOS 101 or stored separately and loaded by BIOS 101 at boot time. Each vendor may implement the protocol interfaces to suit their license store implementation. In some servers, the driver may provide these interfaces using IPMI commands or a Shared Memory Access (SMA) mechanism, to send and receive license data from the host to an iDRAC License Management Populator.

Vendor devices, like Software RAID controllers, simply lookup this protocol when their option rom driver is loaded by BIOS 101, and use the GetLicenseData interface to fetch their license data. Other devices like PERC controllers may use the VerifyLicenseData interface to provide the license data they have persisted and ask the license store to verify if they have the correct license. If there is a mismatch, the license store can return the new license data as part of the response and the PERC controller may apply the new license data. The controller may then call the ResetSystem interface to request a system boot for the new license data to take effect.

Figure 5:
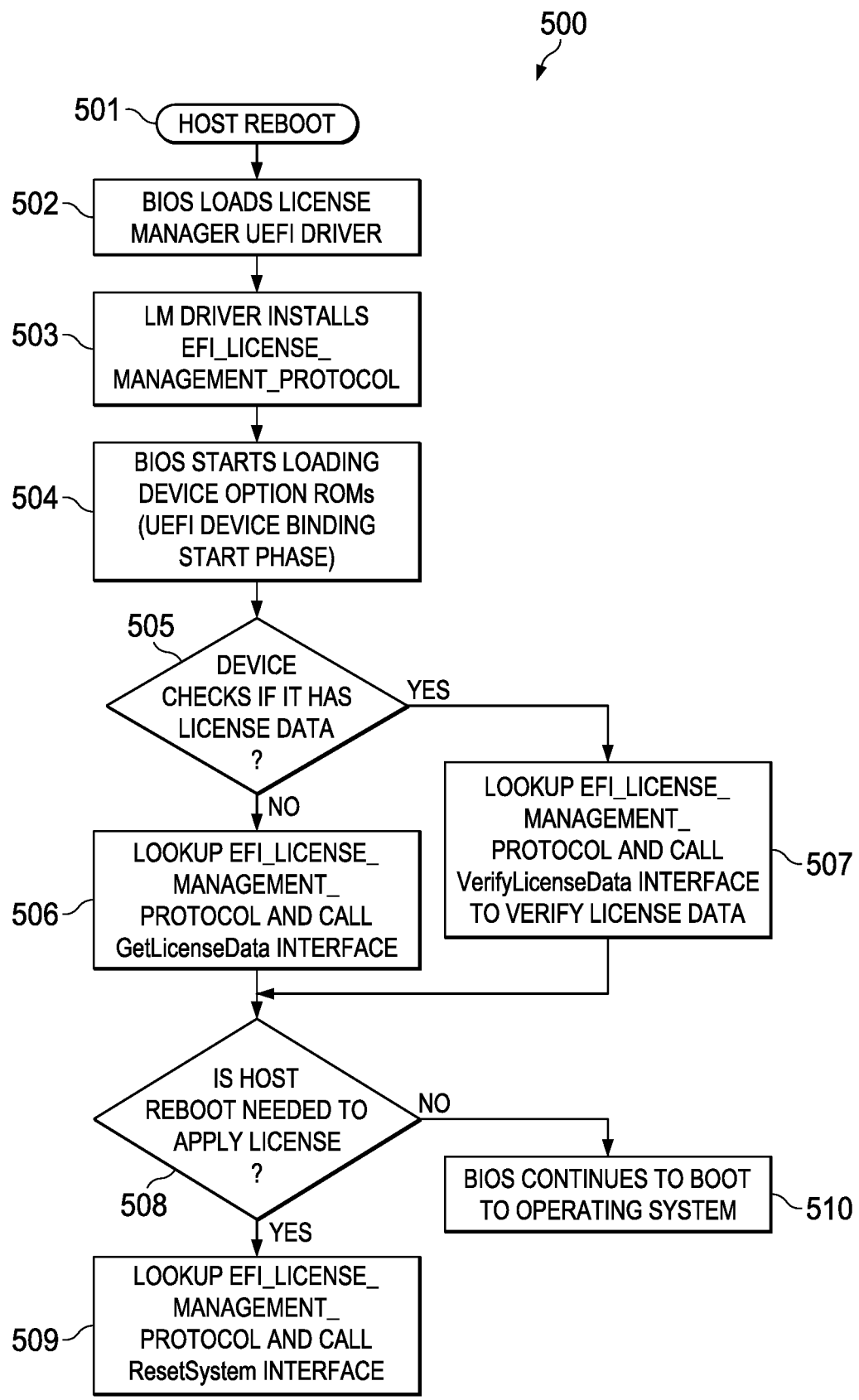
FIG. 5 is a flowchart of an example of a method for performing license management in a pre-boot environment according to some embodiments.

FIG. 5 is a flowchart of an example of a method for performing license management in a pre-boot environment. In some embodiments, method 500 may be performed, at least in part, by BIOS 101 of FIG. 1. At block 501, IHS 102 boots or reboots. At block 502, BIOS 101 loads a license manager UEFI driver, which may be part of EFI boot services 404 in FIG. 4 or may be stored within license manager 116 of controller 114. At block 503, the license manager UEFI driver installs the EFI_LICENSE_MANAGEMENT_PROTOCOL protocol. And, at block 504, BIOS 101 starts loading device option ROMs (UEFI device binding start phase).

At block 505, the device checks if it has the necessary or desired license data. If not, it looks up the EFI_LICENSE- _MANAGEMENT_PROTOCOL and calls the GetLicenseData interface. Otherwise, it looks up the EFI_LICENSE_MANAGEMENT_PROTOCOL and calls the VerifyLicenseData interface to verify license data.

At block 508, the device determines whether IHS 102 needs to be rebooted in order for the license obtained at blocks 506 or 507 to apply. If not, BIOS 101 continues to boot to the OS at block 510. Otherwise, at block 509, the device looks up the EFI_LICENSE_MANAGEMENT_PROTOCOL and calls the ResetSystem interface to cause the reboot.

Figure 6:
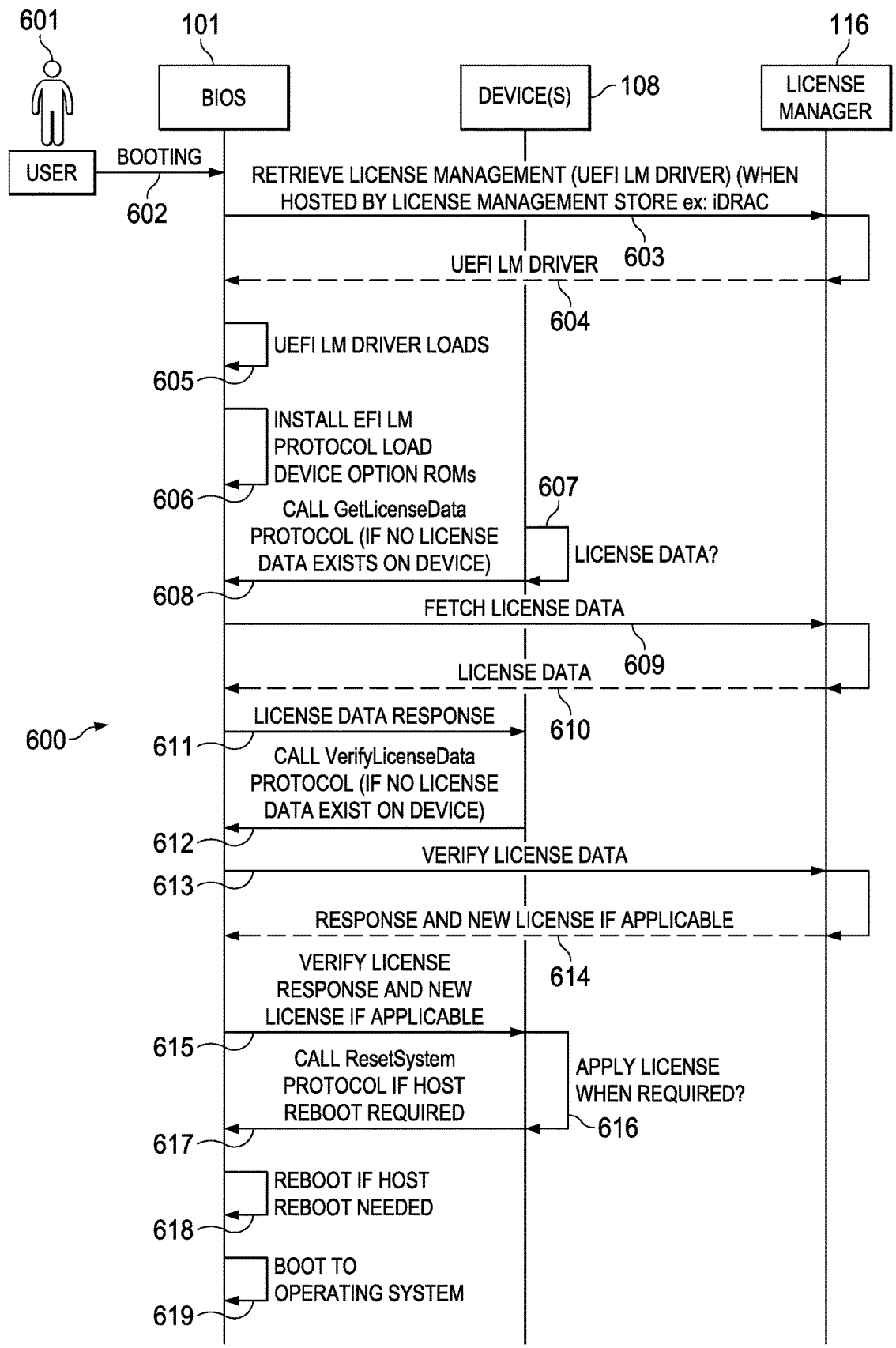
FIG. 6 is a message diagram illustrating an example of a method for license management in a pre-boot environment according to some embodiments.

FIG. 6 is a message diagram illustrating an example of a method for license management in a pre-boot environment according to some embodiments. At the outset, user 601 boots IHS 102, which includes BIOS 101, with command or message 602. BIOS 101 then retrieves the license manager UEFI driver, in this case from license manager 116, using command or message 603. License manager 116 returns the driver to BIOS 101 via command or message 604. BIOS 101 then loads the driver at 605. BIOS 101 also installs the protocol provided therein, and loads device 108's option ROM at 606.

At 607, device 108 determines whether it needs to get license data in order to operate and/or to make a particular feature available to user 601. If so, command or message 608 to BIOS 101 calls the GetLicenseData interface (if no license data exists on device 108). In response, BIOS 101 sends command or message 609 to license manager 116 to fetch the license data, and license manager returns the license data in command or message 610. BIOS 101 then provides a license data response 611 to device 108.

Additionally or alternatively, device 108 may call the VerifyLicenseData interface (if license data exists of device 612) with command or message 612, in response to which BIOS 101 sends a Verify License Data command or message to license manager 116. In response, license manager 116 sends a verification or new license, if applicable, to BIOS 101 via command or message 614. BIOS 101 sends the verification or new license to device 108 via command or message 615, which applies the license when required at 616 and calls the ResetSystem interface if IHS 102's reboot is required at 617. At 618, BIOS 101 causes IHS 102 to reboot, and the IHS 102 boots to its Operating System at 619.

In sum, the systems and methods described herein provide a license management mechanism in a pre-boot environment for server devices. These various techniques provide a generic mechanism which can be incorporated in the UEFI standard, eliminate vendor-specific license management implementations, and/or does not have any hardware dependencies (such as a BMC or external license management server). Moreover, these techniques are flexible, working across multiple devices, including chipset components, and devices that may or may not persist their license(s).

Figure 7:
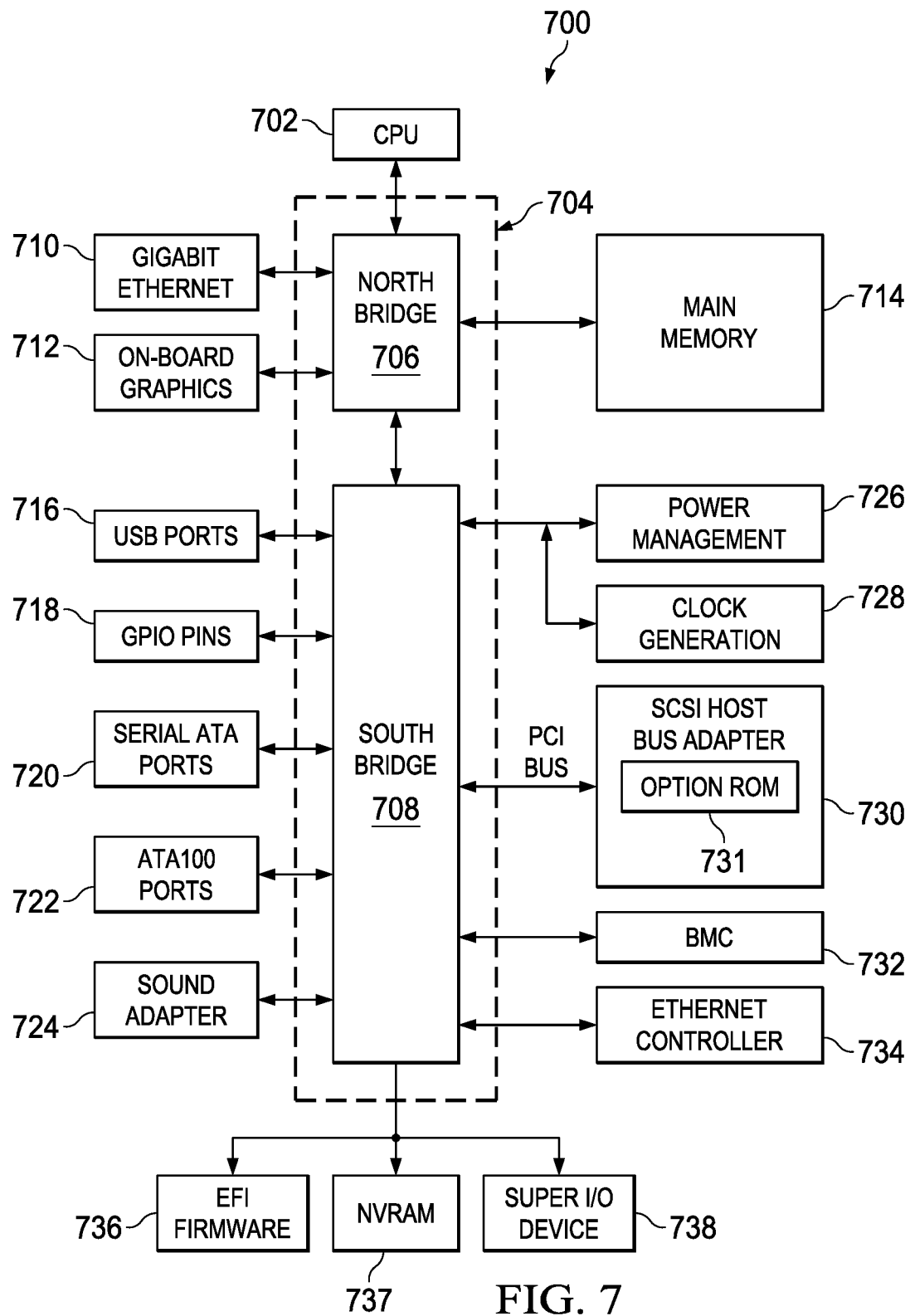
FIG. 7 is a diagram of an example of an IHS configured to implement various systems and methods described herein according to some embodiments.

FIG. 7 shows an example of IHS 700 configured to implement systems and methods described above (e.g., IHS 102 of FIG. 1). It should be appreciated that although certain embodiments described herein may be discussed in the context of a desktop or server computer, other embodiments may be utilized with virtually any type of IHS. Particularly, IHS 700 includes a baseboard or motherboard, which is a printed circuit board (PCB) to which components or devices are coupled by way of a bus or other electrical communication path. For example, central processing unit ("CPU") 702 operates in conjunction with a chipset 704; CPU 702 is a standard central processor that performs arithmetic and logical operations necessary for the operation of IHS 700.

Chipset 704 includes northbridge 706 and southbridge 708. Northbridge 706 provides an interface between CPU 702 and the remainder of IHS 700. Northbridge 706 also provides an interface to a random access memory (RAM) used as main memory 714 in IHS 700 and, possibly, to on-board graphics adapter 712. Northbridge 706 may also be configured to provide networking operations through Ethernet adapter 710. Ethernet adapter 710 is capable of connecting IHS 700 to another IHS (e.g., a remotely located IHS) via a network. Connections which may be made by network adapter 710 may include local area network (LAN) or wide area network (WAN) connections. Northbridge 706 is also coupled to southbridge 708.

Southbridge 708 is responsible for controlling many of the input/output (I/O) operations of IHS 700. In particular, southbridge 708 may provide one or more universal serial bus (USB) ports 716, sound adapter 724, Ethernet controller 734, and one or more general purpose input/output (GPIO) pins 718. Southbridge 708 may also provide a bus for interfacing peripheral card devices such as BIOS boot system-compliant SCSI host bus adapter 730. In some embodiments, the bus may include a peripheral component interconnect (PCI) bus. Southbridge 708 may also provide baseboard management controller (BMC) 732 (controller 114) for use in managing the various components of IHS 700. Power management circuitry 726 and clock generation circuitry 728 may also be utilized during the operation of southbridge 708.

Southbridge 708 is further configured to provide one or more interfaces for connecting mass storage devices to IHS 700. For instance, in an embodiment, southbridge 708 may include a serial advanced technology attachment (SATA) adapter for providing one or more serial ATA ports 720 and/or an ATA100 adapter for providing one or more ATA 100 ports 722. Serial ATA ports 720 and ATA100 ports 722 may be, in turn, connected to one or more mass storage devices storing an operating system (OS) and application programs. An OS comprises a set of programs that control operations of IHS 700 and allocation of resources. An application program is software that runs on top of the OS and uses computer resources made available through the OS to perform application specific tasks desired by the user.

Mass storage devices connected to southbridge 708 and SCSI host bus adapter 730, and their associated computer-readable media provide non-volatile storage for IHS 700. Although the description of computer-readable media contained herein refers to a mass storage device, such as a hard disk or CD-ROM drive, it should be appreciated a person of ordinary skill in the art that computer-readable media may be any available media on any memory storage device that may be accessed by the IHS 700. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count ("LPC") interface may also be provided by southbridge 708 for connecting Super I/O device 738. Super I/O device 738 is responsible for providing a number of I/O ports, including a keyboard port, a mouse port, a serial interface, a parallel port, and other types of input/output ports. The LPC interface may also connect a computer storage media such as a ROM or a flash memory such as a non-volatile random access memory (NVRAM) for storing firmware 736 that includes program code containing the basic routines that help to start up IHS 700 and to transfer information between elements within IHS 700. EFI firmware 736 comprises a firmware that is compatible with the EFI Specification and the Framework.

The LPC interface may also be utilized to connect NVRAM 737 to IHS 700. NVRAM 737 may be utilized by firmware 736 to store configuration data for IHS 700. In other embodiments, configuration data for IHS 700 may be stored on the same NVRAM 737 as the firmware 736.

BMC 732 may include non-volatile memory having program instructions stored thereon that are usable by CPU(s) 702 to enable remote management of IHS 700. For example, BMC 732 may enable a user to discover, configure, and manage BMC 732, setup configuration options, resolve and administer hardware or software problems, etc. Additionally or alternatively, BMC 732 may include one or more firmware volumes, each volume having one or more firmware files used by the BIOS' firmware interface to initialize and test components of IHS 700.

As a non-limiting example of BMC 732, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state, because iDRAC is embedded within IHS 700 from the factory.

It should be appreciated that, in other embodiments, IHS 700 may comprise other types of computing devices, including hand-held computers, embedded computer systems, personal digital assistants, and other types of computing devices. It is also contemplated that the IHS 700 may not include all of the components shown in FIG. 7, may include other components that are not explicitly shown in FIG. 7, or may utilize an architecture different than that shown in FIG. 7.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes may be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
loading, by a processor of an Information Handling System (IHS) in response to execution of Basic System Input/Output (BIOS) code and prior to the booting of any Operating System (OS) by the IHS, a Unified Extensible Firmware Interface (UEFI) driver;
executing, by the processor, a command received from a Redundant Array of Independent Disks (RAID) component coupled to the IHS, wherein the command follows a license management protocol provided by the UEFI driver;
at least one of: (a) in response to the RAID component lacking license data stored therein, executing the command, by the processor, as a get license command, or (b) in response to the RAID component having license data stored therein, executing the command, by the processor, as a verify license command;
determining, by the RAID component, if the license data indicates that a reboot of the IHS is required in order for the license data to take effect; and
in response to a determination that the reboot is required, rebooting the IHS prior to the booting of any OS.

2. The method of claim 1, wherein the license data is obtained or verified prior to the booting of any OS by the IHS being completed.

3. The method of claim 1, further comprising loading, by the processor, an Option Read Only Memory (ROM) of the RAID component coupled to the IHS by starting a UEFI binding process.

4. The method of claim 1, wherein the license data is configured to allow the RAID component to enable a corresponding feature in the RAID component.

5. The method of claim 1, wherein the command includes an Intelligent Platform Management Interface (IPMI) or Shared Memory Access (SMA) command.

6. The method of claim 1, wherein executing the command includes communicating with a license store.

7. The method of claim 6, wherein the license store is provided by a baseboard management controller (BMC) coupled to the IHS.

\* \* \* \* \*